(12) United States Patent
Maruyama et al.

(10) Patent No.: US 8,054,389 B2
(45) Date of Patent: Nov. 8, 2011

(54) LIQUID CRYSTAL DISPLAY APPARATUS HAVING PARTICULAR OPTICAL COMPENSATION LAYERS

(75) Inventors: Tomoko Maruyama, Kanagawa (JP); Yuki Aikawa, Tokyo (JP); Shouhei Maezawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 12/084,032

(22) PCT Filed: Oct. 23, 2006

(86) PCT No.: PCT/JP2006/321066
§ 371 (c)(1),
(2), (4) Date: Apr. 15, 2009

(87) PCT Pub. No.: WO2007/052488
PCT Pub. Date: May 10, 2007

(65) Prior Publication Data
US 2009/0219455 A1 Sep. 3, 2009

(30) Foreign Application Priority Data

Oct. 31, 2005 (JP) ................. 2005-315654

(51) Int. Cl.
*G02F 1/1335* (2006.01)
(52) U.S. Cl. ................. 349/5; 349/117; 349/95
(58) Field of Classification Search .............. 349/5, 117, 349/95
See application file for complete search history.

(56) References Cited

U.S. PATENT DOCUMENTS

| 6,784,961 | B2* | 8/2004 | Suzuki et al. ............... 349/117 |
| 6,885,422 | B2* | 4/2005 | Suzuki et al. ............... 349/121 |
| 6,924,856 | B2* | 8/2005 | Okumura et al. ............ 349/96 |
| 7,732,809 | B2  | 6/2010 | Adachi et al. ............... 257/40 |

FOREIGN PATENT DOCUMENTS

JP 2000-137202 A 5/2000
(Continued)

OTHER PUBLICATIONS

Japanese Office Action issued Mar. 24, 2011 for corresponding Japanese Application No. 2005-315654.
(Continued)

*Primary Examiner* — Mike Qi
(74) *Attorney, Agent, or Firm* — Rader, Fishman & Grauer PLLC

(57) ABSTRACT

A liquid crystal display apparatus which includes an optical compensation layer in addition to a liquid crystal panel and which is capable of preventing degradation of the optical compensation layer, thereby providing high long-term reliability in display characteristics, is provided. The liquid crystal display apparatus includes a liquid crystal panel 1 in which a liquid crystal layer 30 is interposed between a first substrate 10 and a second substrate 20; a protection substrate 3 disposed at least one side of the liquid crystal panel 1 so as to face the liquid crystal panel 1; and an optical compensation layer 5 interposed between the liquid crystal panel 1 and the protection substrate 3. In addition, the liquid crystal display apparatus further includes polarizing plates 110 and 110 disposed at either side of the liquid crystal panel 1 on which the protection substrate 3 is provided; an illumination optical system irradiating the liquid crystal panel 1 with light h through one of the polarizing plates 110 and 110, and a projector lens projecting the light h that passes through the liquid crystal panel 1.

13 Claims, 12 Drawing Sheets

FOREIGN PATENT DOCUMENTS

| | | |
|---|---|---|
| JP | 2002-014345 | 1/2002 |
| JP | 2002-107831 A | 4/2002 |
| JP | 2002-268139 A | 9/2002 |
| JP | 2003-295167 A | 10/2003 |
| JP | 2004-220000 A | 8/2004 |
| JP | 2004-317752 A | 11/2004 |

OTHER PUBLICATIONS

Japanese Office Action issue May 31, 2011 for corresponding Japanese Application No. 2005-315654.

* cited by examiner

SPRAY ALIGNMENT    HYBRID ALIGNMENT    PLANAR ALIGNMENT

FIG. 7
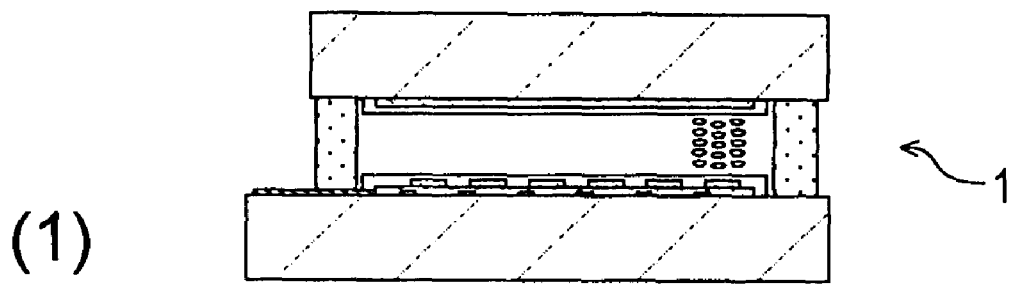
(1)
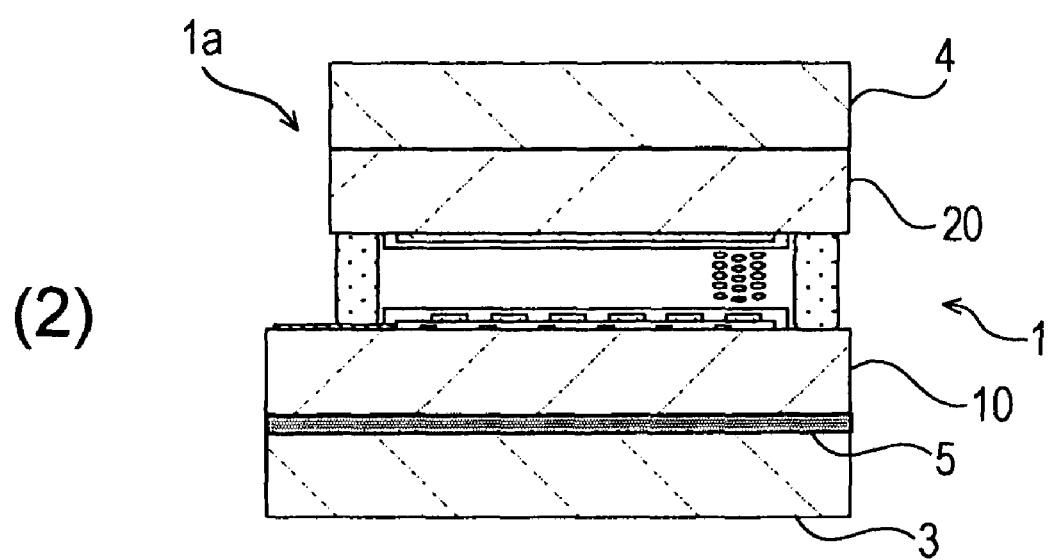
(2)

LIQUID CRYSTAL DISPLAY APPARATUS HAVING PARTICULAR OPTICAL COMPENSATION LAYERS

TECHNICAL FIELD

The present invention relates to liquid crystal display apparatuses, and more particularly, to a liquid crystal display apparatus suitable for a projection-type structure using a liquid crystal panel as a light valve.

BACKGROUND ART

A liquid crystal panel includes a liquid crystal layer interposed between two substrates and is used in combination with polarizing plates as a display for a television set or a personal computer, or as a light valve for a projection-type display apparatus (liquid crystal projector).

Important performances required of these display apparatuses include transmissivity (brightness) and contrast (white/black illumination rate). High transmissivity provides bright images and, for projectors, reduces electric power consumption of a light source, such as an LED, a fluorescent lamp, or an UHP lamp, at the same time. In addition, high contrast provides high-definition images.

However, in the liquid crystal display apparatus using the above-described liquid crystal panel, a phase difference at the liquid crystal layer serves as one of the causes of reduction in contrast. More specifically, although linearly polarized light incident on the liquid crystal layer is ideally emitted as linearly polarized light, elliptically polarized light is emitted in practice because orientations of liquid crystal molecules near substrate interfaces do not change even when a voltage is applied. In addition, incident light with a polar angle is not transmitted along an optical axis of the liquid crystal molecules, and therefore is also emitted as elliptically polarized light. Then, when the elliptically polarized light is emitted from the liquid crystal panel, so-called light leakage occurs in which light passes through the polarizing plate at the emission side during black display. This leads to degradation of contrast.

Accordingly, in the liquid crystal display apparatus, an optical compensation layer for compensating for the optical phase difference generated at the liquid crystal layer is provided, thereby achieving a black level display without light leakage. Such an optical compensation layer includes, for example, a film of liquid crystal material oriented in a predetermined state. In addition, in a liquid crystal panel portion of, for example, a liquid crystal projector, an incident-side polarizing plate, a liquid crystal panel, a single-layer or a double-layer optical compensation layer (optical compensation element), and an emission-side polarizing plate are arranged in that order from a light incident side. In this state, the optical compensation layer may be disposed in a state such that the optical compensation layer is in tight contact with the liquid crystal panel (for the above, refer to Japanese Unexamined Patent Application Publication No. 2002-14345 (paragraphs 29-30 and 46)).

However, in the liquid crystal display apparatus having the above-described structure, the optical compensation layer is disposed in such a state that the optical compensation layer is exposed to the atmosphere. Therefore, there is a problem that the optical compensation layer is easily degraded due to supply of oxygen and moisture. In particular, in the projection-type liquid crystal display apparatus, since the liquid crystal panel is irradiated with strong light, the optical compensation layer made of an organic material, such as the above-described film of liquid crystal material, is severely damaged due to the presence of oxygen and moisture, and is required to have light resistance.

Therefore, it is an object of the present invention to provide a liquid crystal display apparatus which includes an optical compensation layer in addition to a liquid crystal panel and which is capable of preventing degradation of the optical compensation layer, thereby providing high long-term reliability in display characteristics.

DISCLOSURE OF INVENTION

A liquid crystal display apparatus according to the present invention for solving the above-described problems includes a liquid crystal panel in which a liquid crystal layer is interposed between two substrates. In addition, a protection substrate is disposed at least one side of the liquid crystal panel, and an optical compensation layer is interposed between the protection substrate and the liquid crystal panel.

In the liquid crystal display apparatus having the above-described structure, since the optical compensation layer is interposed between the liquid crystal panel and the protection substrate, the optical compensation layer is disposed in such a state that the optical compensation layer is blocked from oxygen and moisture. Therefore, degradation of the optical compensation layer is prevented. For example, even in an environment where strong light is irradiated, the optical characteristics of the optical compensation layer are maintained.

As described above, in the liquid crystal display apparatus according to the present invention, degradation of the optical compensation layer can be prevented. Therefore, it is possible to improve the long-term reliability of the display characteristics. In particular, even in an environment where strong light is irradiated, the optical characteristics of the optical compensation layer are maintained. Therefore, even in the projection-type liquid crystal display apparatus in which the liquid crystal panel is irradiated with strong light, the long-term reliability of the display characteristics can be improved.

BRIEF DESCRIPTION OF THE DRAWINGS

FIG. 7 is a diagram showing a manufacturing procedure of the liquid crystal panel portion.

BEST MODE FOR CARRYING OUT THE INVENTION

Next, as embodiments of liquid crystal display apparatuses according to the present invention, the structure of projection-type liquid crystal display apparatuses using liquid crystal panels as light valves will be described. In the following descriptions, the overall structure of a liquid crystal display apparatus, the structure of the liquid crystal panel portions provided in liquid crystal display apparatuses, and a manufacturing method of the liquid crystal panel portions will be explained in that order.

First Embodiment

<Overall Structure of Liquid Crystal Display Apparatus>

Figure 1:
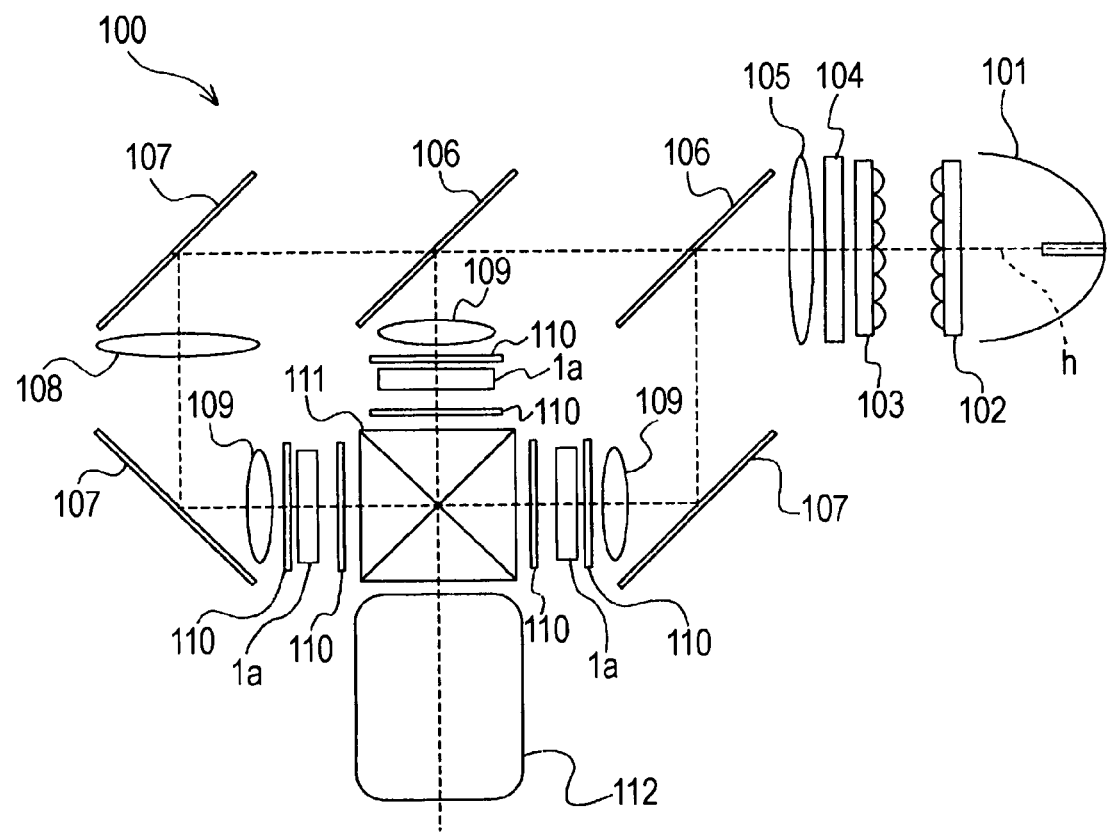
FIG. 1 is a structure diagram showing the overall structure of a liquid crystal display apparatus to which the present invention is applied.

FIG. 1 is a structure diagram of a projection-type liquid crystal display apparatus 100 to which the present invention is applied. The projection-type liquid crystal display apparatus 100 shown in this figure is a so-called liquid crystal projector, and is a so-called three-plate projector in which light (illumination light) h from a light source 101 is separated into three primary colors of red (R), blue (B), and green (G) and a single liquid crystal panel is used for each of the colors as a light valve to present a color image display.

In this liquid crystal display apparatus 100, fly-eye lenses 102 and 103, a PS synthesizing element 104, and a condenser lens 105 are arranged in that order on a light path of light h from the light source 101. In addition, a light path of the light h that has passed through these elements has dichroic mirrors 106 for dividing the light h, mirrors 107 for changing directions of the divided light h, and a relay lens 108 that is provided as necessary. These mirrors 106 and 107 are configured to separate the light h into three colors. In addition, a field lens 109 is arranged on a light path of the light h of each of the colors that are separated from each other as described above.

In addition, light paths of the three lights h that have passed through the above-described illumination optical system have two polarizing plates 110 arranged in a crossed Nicols state and a liquid crystal panel portion 1a interposed between these polarizing plates 110. The liquid crystal panel portions 1a are used as light valves in the liquid crystal display apparatus 100, and have a characteristic structure of the present invention, as explained below.

In addition, a dichroic prism 111 having a function of combining the lights of three colors is placed at a position where light paths of respective lights h that have passed through the sets of the polarizing plates 110 and the liquid crystal panel portions 1a. A projector lens 112 for projecting the light combined by the dichroic prism 111 onto a screen is disposed at the emission side of the dichroic prism 111. The projector lens 112 has a focal length F# of, for example, 1.5 to 2.5.

Due to the above-described structure, in the liquid crystal display apparatus 100, a video signal input from the outside is input to each of the R, G, and B liquid crystal panel portions 1a, and intensities of light transmitted through corresponding pixels are adjusted in each liquid crystal panel portion 1a, so that an arbitrary image is projected and displayed.

<Structure of Liquid Crystal Panel Unit>

Figure 2:
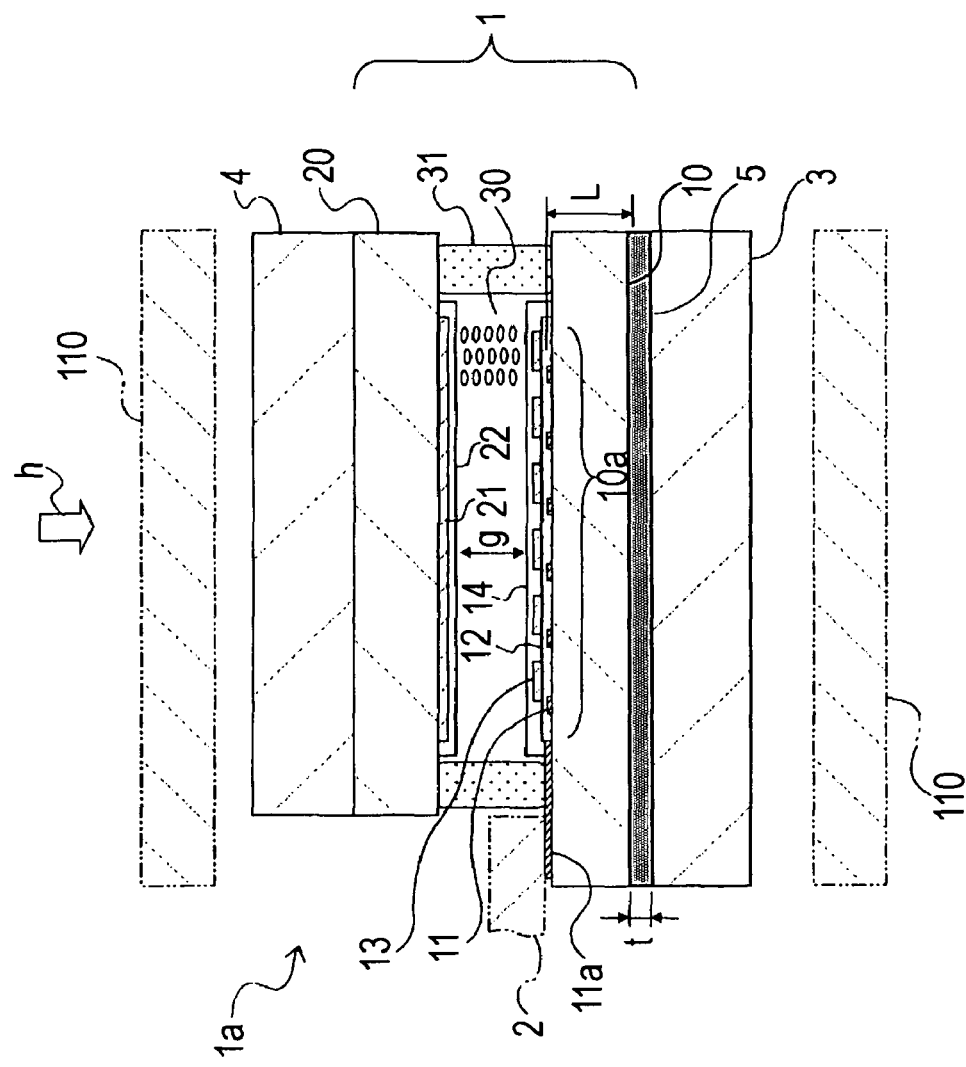
FIG. 2 is a schematic sectional view of the main part of a liquid crystal panel portion provided in a liquid crystal display apparatus of a first embodiment.

FIG. 2 is a schematic sectional view of the main part of a liquid crystal panel portion 1a provided in the liquid crystal display apparatus. As shown in this figure, the liquid crystal panel portion 1a is used as a light valve in the above-described projection-type liquid crystal display apparatus, and is disposed between the two polarizing plates 110 arranged in a crossed Nicols state. In the liquid crystal panel portion 1a, protection substrates 3 and 4 are disposed on outer sides of a liquid crystal panel 1 and are adhered so as to face each other. Furthermore, the structure in which an optical compensation layer 5 is interposed between the liquid crystal panel 1 and the protection substrate 3 disposed at least one side of the liquid crystal panel 1 so as to face the liquid crystal panel 1 serves as the characteristic structure of the present embodiment. In the following description, the detailed structure of each component will be explained.

First, the liquid crystal panel 1 has a general structure in which a liquid crystal layer 30 is interposed between a first substrate 10 and a second substrate 20, and is structured, for example, as follows.

First, the first substrate 10 is composed of an insulating substrate having optical transparency, such as quartz. TFTs 11 and capacitive elements (not shown) are arranged in a matrix pattern on a surface of the first substrate 10 facing the liquid crystal layer 30 in a central display area 10a, thereby constituting a TFT substrate. The first substrate 10 on which the TFTs 11 are arranged is covered with an interlayer insulating film 12. Pixel electrodes 13 are arranged on the interlayer insulating film 12 so as to be connected to the TFTs 11 through connection holes (not shown). In addition, an alignment film 14 is provided so as to cover the pixel electrodes 13.

Incidentally, when quartz, which has a high heat resistance, is used as the first substrate 10 on which the TFTs 11 are provided, high-temperature polysilicon can be used to form the TFTs 11. Therefore, miniaturization can be achieved. However, multi-component non-alkali glass or plastic substrate may also be used as the first substrate 10 because quartz is expensive. In such a case, low-temperature polysilicon or amorphous silicon is used to form the TFTs 11.

On the other hand, the second substrate 20 is composed of an insulating substrate having optical transparency, such as quartz, multi-component non-alkali glass, or plastic substrate. A counter electrode 21 is disposed so as to extend over a surface of the second substrate 20 facing the liquid crystal layer 30. An alignment film 22 is provided so as to cover the counter electrode 21.

In addition, the liquid crystal layer 30 is sealed between the first substrate 10 and the second substrate 20 by a sealant 31 that is disposed between the first substrate 10 and the second substrate 20 so as to extend along the periphery thereof. Furthermore, the liquid crystal layer 30 is sealed in such a manner that a film thickness (i.e., a cell gap) is adjusted to a predetermined designed value.

Furthermore, a drive circuit is provided on the first substrate 10 in the same layer as the TFTs 11 and a wiring layer connected to the TFTs 11. Wires 11a connected to the drive circuit are provided in such a manner that the wires 11a are led out of the display area 10a surrounded by the sealant 31. In addition, these wires 11a are configured to be connected to a flexible printed circuit 2 for inputting a video signal.

The protection substrates 3 and 4 adhered to the liquid crystal panel 1 having the above-described structure are composed of insulating substrates having optical transparency. These protection substrates 3 and 4 are formed of materials having a high transmissivity, such as quartz and crystallized glass. Alternatively, materials having a high thermal conductivity, such as sapphire and crystal, may also be used. In such a case, radiation effect obtained by the protection substrates 3 and 4 is increased, and therefore light-resistant and heat-resistant life of the optical compensation layer 5 and the liquid crystal layer 30 can be increased.

In addition, the optical compensation layer 5 disposed between the first substrate 10 of the liquid crystal panel 1 and the protection substrate 3 is provided to compensate for an optical phase difference generated in the liquid crystal layer 30 when black display is presented using the liquid crystal panel 1. The optical compensation layer 5 has a phase difference suitable to compensate for the generated phase difference so that a good black-level display can be presented. In addition, the optical compensation layer 5 is provided in such a state that the optical compensation layer 5 is interposed between the first substrate 10 of the liquid crystal panel 1 and the protection substrate 3 without protruding therefrom.

The above-described optical compensation layer 5 has a predetermined double refractive index $\Delta n$. In addition, the optical compensation layer 5 has a predetermined film thickness t determined from the double refractive index $\Delta n$ of the material used and the phase difference required of the optical compensation layer 5.

Here, with regard to the film thickness t of the optical compensation layer 5, the simulation of the contrast improvement rate, which serves as an index of black display performance, was performed by varying the film thickness of the optical compensation layer 5. The result of the simulation will be explained below. With regard to the simulation conditions, in the liquid crystal panel 1, the double refractive index $\Delta n$ (lc) of the liquid crystal layer 30 was set to 0.16, and the cell gap g thereof was set to 2.4 to 2.8 μm. In addition, the double refractive index $\Delta n$ of the optical compensation layer 5 was set to 0.16.

Figure 3:
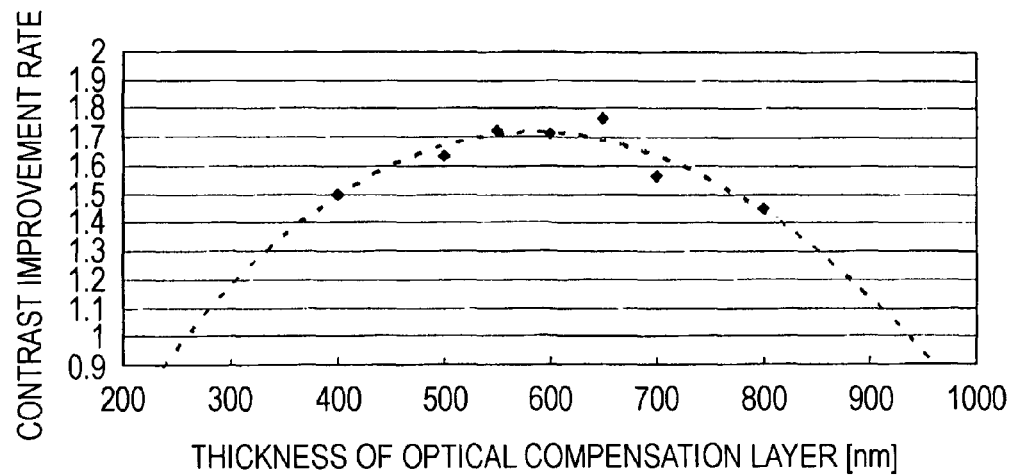
FIG. 3 is a graph showing the relationship between the film thickness of an optical compensation layer and the improvement rate of contrast of the liquid crystal display apparatus.

The result of the above-described simulation is shown in the graph of FIG. 3. As shown in this graph, to improve the contrast (to increase the contrast improvement rate to 1 or more) by compensating for the optical phase difference generated in the liquid crystal layer 30 when the black display is presented using the liquid crystal panel 1 having the above-described structure, the film thickness t thereof is preferably in the range of 0.25 μm to 0.95 μm if the optical compensation layer 5 has a double refractive index $\Delta n$ of 0.16. In addition, it can be understood that the contrast obtained when the film thickness t is around 0.6 μm, which corresponds to the highest contrast improvement rate, is about 1.7 times as high as that obtained in the case in which no optical compensation layer is provided. Incidentally, the above-described conditions differ in accordance with the design of each liquid crystal panel.

Incidentally, an optical compensation layer having a double refractive index $\Delta n$ in the range of 0.1 to 0.25 is generally used as the optical compensation layer 5. In this case, it was determined by the simulation that the phase difference required of the optical compensation layer 5 is preferably in the range of 20 nm or more and 80 nm or less. In addition, if the film thickness t of the optical compensation layer 5 is 0.5 to 0.7 μm, the phase difference is preferably in the range of 30 to 40 nm.

Figure 4:
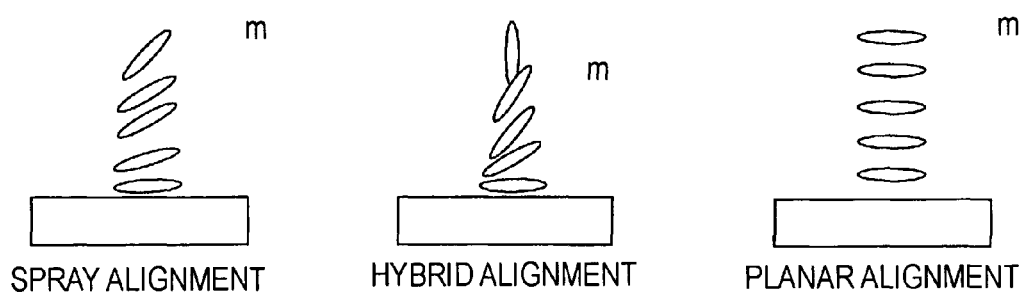
FIG. 4 is a diagram showing alignments of a liquid crystal material constituting the optical compensation layer.

In addition, the optical compensation layer 5 having the above-described structure is composed of, for example, a photosensitive liquid crystal material (UV curable liquid crystal polymer) aligned in a predetermined direction. For example, nematic liquid crystal or discotic liquid crystal may be mainly used as the liquid crystal material. These liquid crystal materials may either have a positive birefringence or a negative birefringence. As shown in FIG. 4, the kinds of alignments of the above-described liquid crystal molecules m include a planar alignment, a spray alignment, a hybrid alignment, etc.

Furthermore, referring to the above-mentioned FIGS. 1 and 2, the liquid crystal panel portions 1a having the above-described structure are arranged in the liquid crystal display apparatus 100 such that the light h from the illumination optical system of the liquid crystal display apparatus 100 is incident on the second substrates 20 thereof. In addition, the liquid crystal panel portions 1a are configured to be disposed between the field lenses 109 and the projector lens 112 (dichroic prism 111) such that the layer on which the TFTs 11 is formed in the liquid crystal panel 1 is located at a focal point (focal plane) of the projector lens 112 of the liquid crystal display apparatus.

In addition, in the above-described arrangement, the optical compensation layer 5 is disposed on a plane substantially parallel to the liquid crystal layer 30. If the optical compensation layer 5 is too close to the layer on which the TFTs 11 are formed, uniformity defects, such as unevenness, spotting, separation, etc., will occur in the process of forming the optical compensation layer 5 or foreign matter that adheres thereto in a film deposition step will be seen on the screen. This leads to reduction in quality and yield. To prevent this, it is important that the optical compensation layer 5 of the above-described liquid crystal panel be positioned at a defocus position of the projector lens 112.

Figure 5:
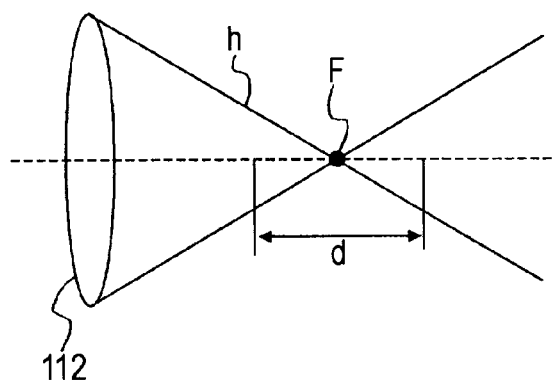
FIG. 5 is a diagram showing a focal point and a focal depth of a projector lens.

Here, as shown in FIG. 5, the defocus position of the projector lens 112 refers to a position outside a range of focal depth d extending forward and rearward from a focal point (focal plane) F of the projector lens 112, and outside a range in which a clear image can be formed. Accordingly, the thickness of the first substrate 10 is adjusted such that the optical compensation layer 5 is disposed at a defocus position.

In addition, the degree of defocusing at planes in front of and behind a plane at which the focal point F is positioned depends on the focal depth d of the projector lens 112. When the wavelength of the light h is $\lambda$ and the numerical aperture of the projector lens 112 is NA, the focal depth d is expressed by Equation (1) as follows:

$$d = \frac{\lambda}{2NA^2} \quad (1)$$

Furthermore, when the refractive index of the projector lens 112 is N, the focal length F# (1.5 to 2.5) of the projector lens 112 of the liquid crystal display apparatus is expressed by Equation (2) as follows:

$$F\# = \frac{N}{2NA} \quad (2)$$

It is understood from Equations (1) and (2) that as the focal length F# of the projector lens 112 is reduced, the focal depth d is reduced, although a larger amount of light can be captured. Therefore, in general, defocusing easily occurs as the focal depth d is reduced.

Figure 6:
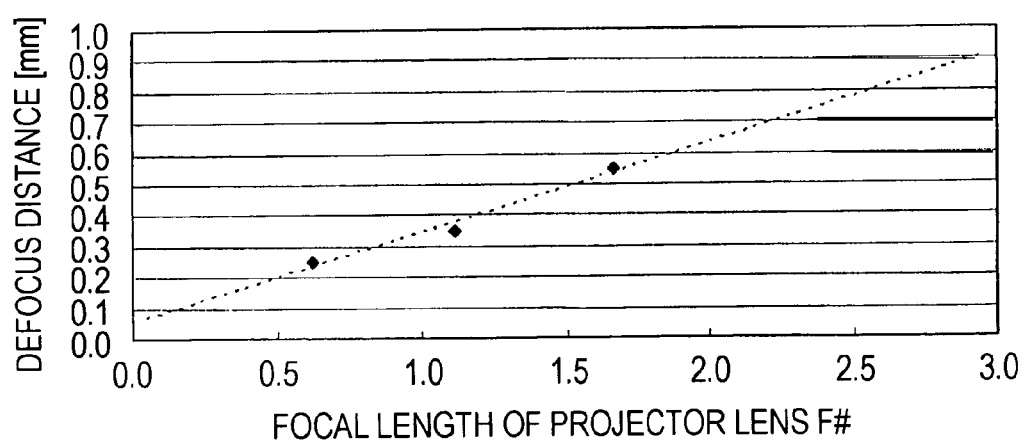
FIG. 6 is a diagram showing the relationship between the focal point of the projector lens and a defocus distance.

An experiment for determining the relationship between the focal length F# of the projector lens and the minimum distance to a defocus position (hereinafter referred to as a defocus distance) was performed. In this experiment, objective lenses with different numerical apertures NA (focus distances F#) are attached to a microscope and foreign matters on an optical compensation layer interposed between polarizing plates arranged in a crossed Nicols state was observed. This experiment allows to establish a model of the state in which a projector lens focuses onto a liquid crystal display element in a projection-type liquid crystal display apparatus. The result of the experiment is shown in FIG. 6. It is clear from the figure that the defocus distance is reduced as the numerical aperture NA is increased, and NA and the defocus distance are proportional to each other, as in the theory.

Here, the focal length F# of the projector lens 112 used in the liquid crystal display apparatus 100 having the above-described structure is 1.5 to 2.4. Therefore, referring to the graph shown in FIG. 6, if the focal length F# of the projector lens 112 is 1.5, the optical compensation layer 5 is preferably disposed at a position where the defocus distance is 0.5 mm or more. In addition, if the focal length F# of the projector lens 112 is 2.4, the optical compensation layer 5 is preferably disposed at a position where the defocus distance is 0.8 mm or more.

Taking the above into account, an optical distance L between the layer on which the TFTs 11 are formed and which is positioned at the focal point (focal plane) F of the projector lens 112 and the optical compensation layer 5 is set to 0.5 mm or more (in terms if equivalent air distance=(actual thickness)/(refractive index)). Furthermore, if the thickness of the liquid crystal panel portion 1a will be increased, optical loss occurs and the size of the apparatus is increased. To prevent this and to reduce the apparatus cost, the upper limit of the optical distance L is set to 5.0 mm or less, preferably, to 1.0 mm or less. The optical distance L shown as numerical values corresponds to equivalent air distance, which is calculated as (actual thickness)/(refractive index).

In addition, in the above-described design, the surface of the protection substrate 3 disposed on the optical compensation layer 5 is disposed at a defocus position of the projector lens 112. Therefore, foreign matter that adheres to the surface of the protection substrate 3 does not form an image on the projection plane. In addition, on the side of the second substrate 20, the thickness of the protection substrate 4 is set such that the exposed surface of the protection substrate 4 is at a defocus position of the projector lens 112. Accordingly, foreign matter that adheres to the surface of the protection substrate 4 does not form an image on the projection plane. In addition, if there is no risk that foreign matter will be placed between the first substrate 10 and the protection substrate 3, also on the side of the first substrate 10, the thickness of the protection substrate 3 may be set such that the surface of the protection substrate 3 is at a defocus position of the projector lens 112.

<Manufacturing Method of Liquid Crystal Panel Portion>

Next, a manufacturing method of the liquid crystal panel portion 1a having the above-described structure will be explained with reference to FIG. 7.

First, as shown in FIG. 7(1), the liquid crystal panel 1 with a predetermined design is manufactured by a common process. For example, the double refractive index Δn (lc) of the liquid crystal layer 30 is set to about 0.16, and the cell gap g thereof is set to about 2.8 μm.

In addition, the protection substrate 3 is prepared, and the optical compensation layer 5 with the above-described design is formed on the protection substrate 3.

In this case, first, for example, an alignment film material, such as polyimide, is applied to the protection substrate 3. Next, the applied polyimide film is subjected to an alignment process by a rubbing method, and is cured by heat. Thus, the alignment film is formed. Alternatively, the alignment film may also be formed using a material that provides an alignment performance by being irradiated with light. In such a case, a non-contact process can be performed and the yield can be improved. In addition, the protection substrate 3 itself can be subjected to the alignment process.

Next, a photosensitive liquid crystal material (UV curable liquid crystal polymer) is applied to the surface subjected to the above-described alignment process at a predetermined film thickness using a method such as a spin coating method, a printing method, and a slit-die coating method that allows uniform application of the material. Then, the liquid crystal molecules in the applied liquid-crystal-material film is aligned. After this, the entire surface of the liquid-crystal-material film is irradiated with UV light so that the liquid-crystal-material film is cured, thereby forming the optical compensation layer 5 with a predetermined film thickness. Here, as described above, the optical compensation layer 5 is formed to have a predetermined film thickness determined by the double refractive index Δn of the liquid crystal material constituting the optical compensation layer 5 and the phase difference required of the optical compensation layer 5.

After the above-described processes, as shown in FIG. 7(2), the protection substrate 3 is adhered to the liquid crystal panel 1 at the side of the first substrate 10 (TFT substrate) with the optical compensation layer 5 interposed therebetween, and the protection substrate 4 is adhered to the liquid crystal panel 1 at the side of the second substrate 20. Thus, the liquid crystal panel section 1a is completed.

In the liquid crystal display apparatus having the liquid crystal panel portion 1a described above in the embodiment, since the optical compensation layer 5 is interposed between the liquid crystal panel 1 and the protection substrate 3, the optical compensation layer 5 is disposed in such a state that the optical compensation layer 5 is blocked from oxygen and moisture. Therefore, degradation of the optical compensation layer 5 is prevented. For example, even in an environment where strong light is irradiated, the optical characteristics of the optical compensation layer 5 are maintained.

Accordingly, it is possible to improve the long-term reliability of the display characteristics including the liquid crystal panel portion 1a. In particular, even in an environment where strong light is irradiated, the optical characteristics of the optical compensation layer 5 are maintained. Therefore, even in the projection-type liquid crystal display apparatus in which the liquid crystal panel 1 is irradiated with strong light, the long-term reliability of the display characteristics can be improved.

Furthermore, since the optical compensation layer 5 is configured to be integrated with the liquid crystal panel 1, the size of the optical system of the liquid crystal display apparatus including the liquid crystal panel portion 1*a* can be reduced.

In addition, in the above-described projection-type liquid crystal display apparatus, the optical compensation layer 5 is arranged at a defocus position of the projector lens. Therefore, the image quality can be prevented from being degraded due to the optical compensation layer 5.

Figure 8:
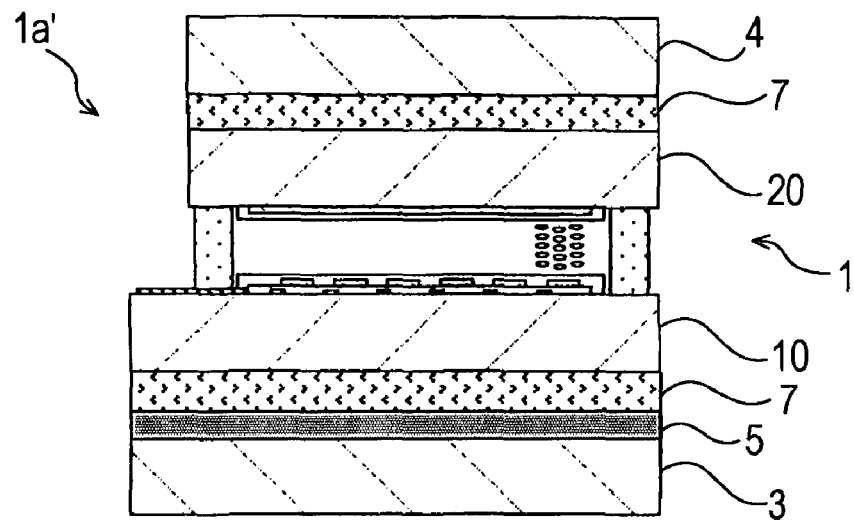
FIG. 8 is a schematic sectional view illustrating the case in which the liquid crystal panel portion of the first embodiment is manufactured using an adhesive.

Incidentally, the protection substrate 3 on which the optical compensation layer 5 is formed and the protection substrate 4 may be adhered to the liquid crystal panel 1 using an adhesive. In such a case, as shown in FIG. 8, the protection substrate 3 on which the optical compensation layer 5 is formed is adhered to the liquid crystal panel 1 at the side of the first substrate 10 (TFT substrate) with an adhesive 7, and the protection substrate 4 is adhered to the liquid crystal panel 1 at the side of the second substrate 20 with an adhesive 7. Thus, the liquid crystal panel portion 1*a*' is completed.

Second Embodiment

In liquid crystal display apparatus explained as an example in the above-described first embodiment, the optical compensation layer 5 is provided on the liquid crystal panel 1 at the side of the first substrate 10. However, the state in which the optical compensation layer 5 is disposed on the liquid crystal panel 1 is not limited to the above-described example.

Figure 9:
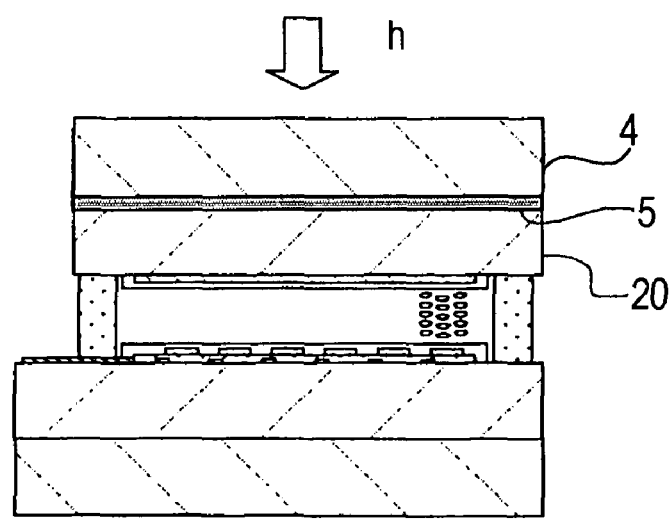
FIG. 9 is a schematic sectional view of a liquid crystal panel portion of a second embodiment.

For example, as shown in FIG. 9, the optical compensation layer 5 may also be interposed between the second substrate (counter substrate) 20 at the incident side of the light h and the protection substrate 4. Also in this case, similar to the above-described first embodiment, the optical compensation layer 5 disposed on the liquid crystal panel 1 is preferably placed at a defocus position of the projector lens in the liquid crystal display apparatus. In addition, similar to the above-described first embodiment, the protection substrate 3 and the protection substrate 4 on which the optical compensation layer 5 is formed may also be adhered to the liquid crystal panel 1 using an adhesive.

Third Embodiment

In the liquid crystal display apparatuses explained in the above-described first and second embodiments, a single optical compensation layer 5 is provided in the liquid crystal panel. However, in the liquid crystal display apparatus according to the present invention, a plurality of optical compensation layers 5 may be provided in the liquid crystal panel.

Figure 10:
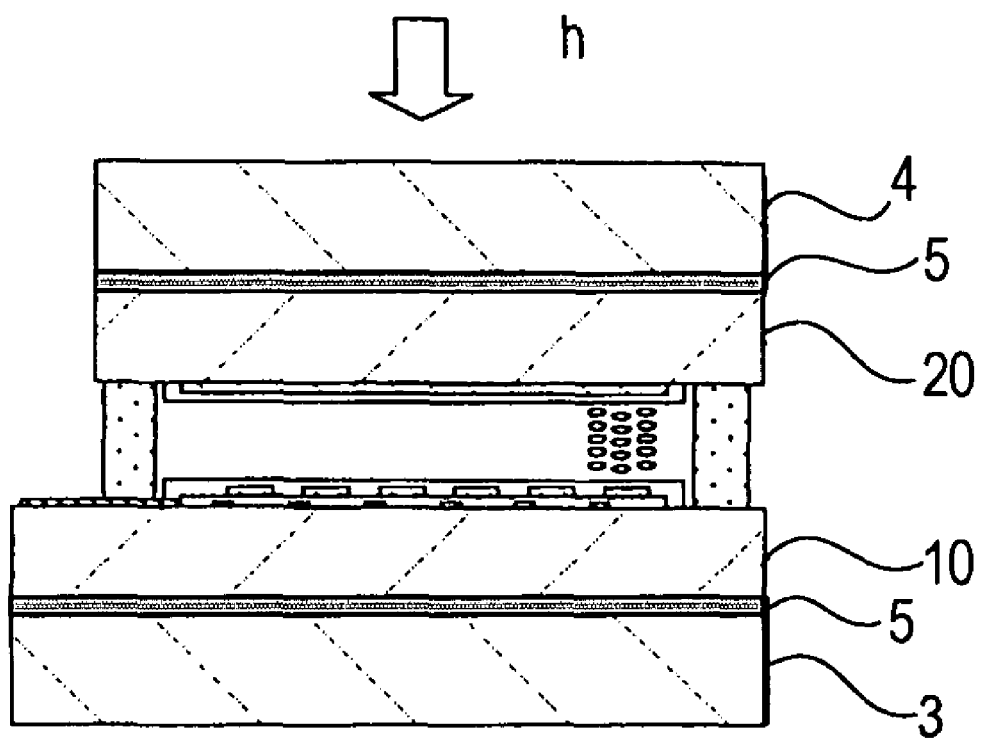
FIG. 10 is a schematic sectional view of a liquid crystal panel portion of a third embodiment.

For example, as shown in FIG. 10, the optical compensation layer 5 may be interposed between the first substrate (TFT substrate) 10 and the protection substrate 3, and between the second substrate (counter substrate) 20 and the protection substrate 4. Also in this case, similar to the above-described first and second embodiments, all of the optical compensation layers 5 and 5 provided in the liquid crystal panel 1 (two layers are provided in this example) are preferably placed at defocus positions of the projector lens in the liquid crystal display apparatus. In addition, similar to the above-described first and second embodiments, the protection substrates 3 and 4 on which the optical compensation layers 5 are formed may also be adhered to the liquid crystal panel 1 using an adhesive.

In this case, each of the optical compensation layers 5 and 5 has the characteristics (film thickness, phase difference, etc.) explained in the above-described embodiments. In addition, the optical compensation layers 5 and 5 are arranged such that delay axes thereof are substantially perpendicular to each other with an intersecting angle of, for example, 87° to 93°.

Here, in the liquid crystal display apparatus 100 explained with reference to FIG. 1, the light h from the light source 101 is incident on the panel surface of the liquid crystal panel portion 1*a* at an incident angle of 20° or less. Here, the incident angle 20° is an angle with respect to the normal of the panel surface of the liquid crystal panel (i.e., polar angle). Therefore, in the state in which the two optical compensation layers 5 and 5 are laminated with the liquid crystal panel 1 placed therebetween, the optical compensation layers 5 and 5 provided in the liquid crystal panel portion shown in FIG. 10 are set such that the sum of the phase differences with respect to the light h incident in all directions at an incident angle of 20° or less is 30 nm or less. In addition, the film thickness of the optical compensation layer 5 is set by selecting the material forming the optical compensation layer 5.

Figure 11:
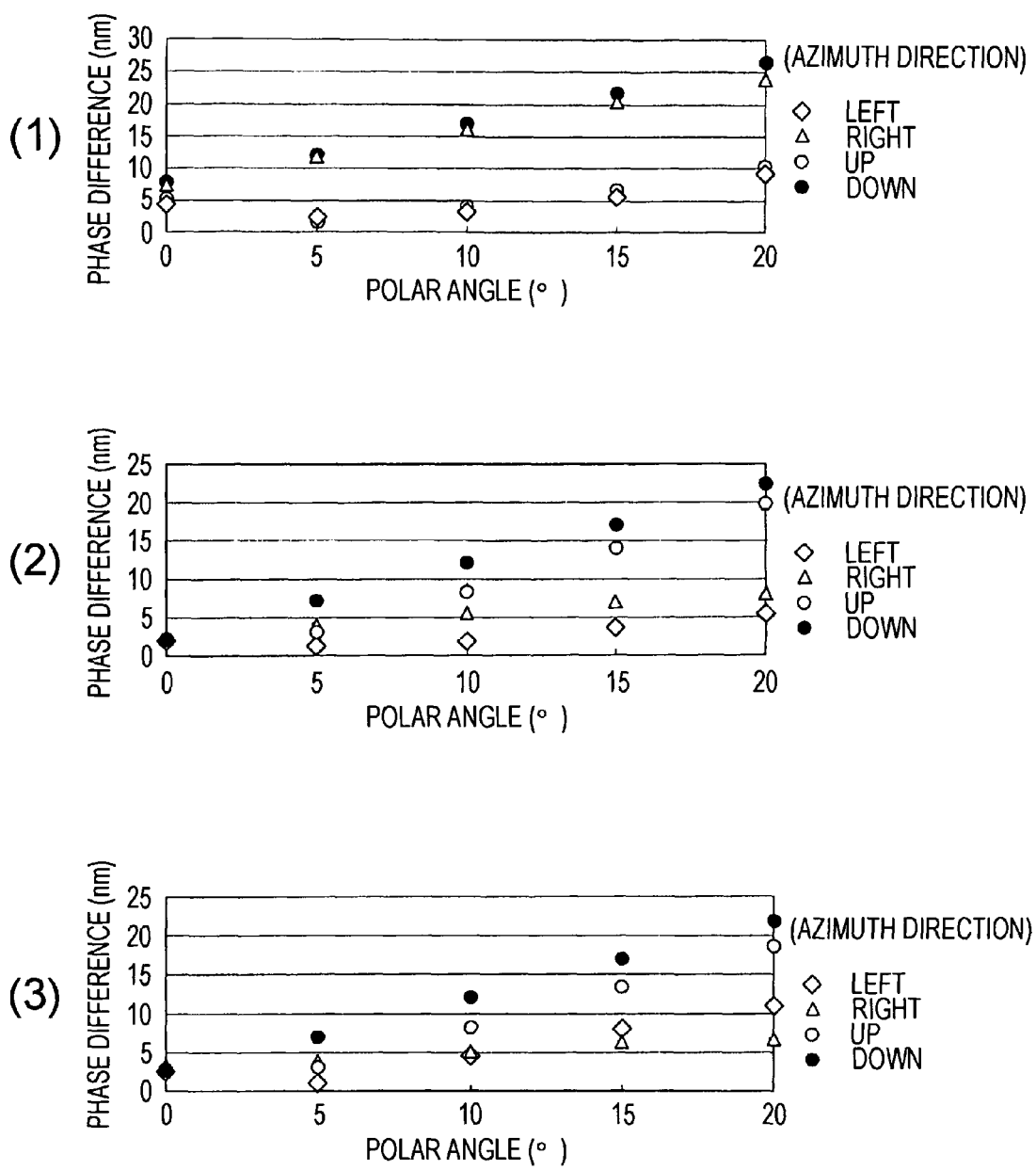
FIG. 11 show graphs showing the relationship between the incident angle of light on a plurality of optical compensation layers disposed in the liquid crystal panel portion and the phase difference.
Figure 12:
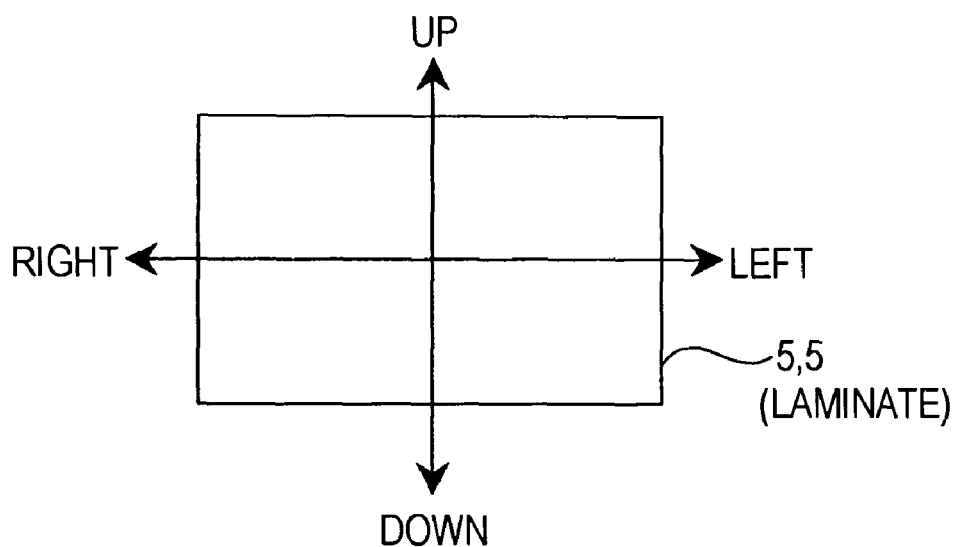
FIG. 12 is a plan view illustrating the incident direction of light in the graphs shown in FIG. 11.

FIGS. 11(1) to 11(3) show the phase difference of the laminate obtained by laminating two optical compensation layers made of the selected material in the case in which light is incident on the laminate in different directions at different incident angles (polar angles). These graphs show the phase differences obtained when light is incident on the laminate at different polar angles in different directions of left, right, up, and down, as shown in FIG. 12. The laminate is obtained by laminating the two optical compensation layers 5 and 5, each of which has a film thickness of about 0.5 μm and a phase difference of about 0.48 nm, such that the delay axes thereof are perpendicular to each other.

As shown in the graphs of FIGS. 11(1) to 11(3), each laminate including the optical compensation layers is set such that the phase difference for the light h incident at an incident angle (polar angle) of 20° or less in all of the directions (left, right, up, and down) is 30 nm or less. In particular, the phase difference for the light h incident in the direction of an incident angle (polar angle) of 0° is set to about 10 nm or less. The reason why the value varies even though the film thickness is substantially constant is because of the influence caused by other factors.

The liquid crystal panel 1 includes the optical compensation layers 5 and 5, each of which is designed such that the laminate in which the optical compensation layers 5 and 5 are laminated has the above-described characteristics. Therefore, the effect of canceling the phase difference generated in the liquid crystal layer 30 constituting the liquid crystal panel 1 by the optical compensation layers 5 and 5 is increased.

In addition, in particular, the characteristics of the laminated optical compensation layers 5 and 5 are set such that the phase difference for the light h incident at an incident angle of 20° or less in all of the directions is 30 nm or less. Therefore, brightness of the black display projected by the liquid crystal display apparatus using the liquid crystal panel portion provided with the optical compensation layers 5 and 5 is sufficiently lower than that obtained by the structure in which no optical compensation layer is provided. Accordingly, the contrast of the liquid crystal display apparatus including the optical compensation layers 5 and 5 can be improved. More specifically, if the contrast of the liquid crystal display apparatus in which no optical compensation layer is provided is 1, the contrast can be increased by a factor of 1.3 or more, taking the manufacturing differences into account.

In addition, the characteristics of the laminated optical compensation layers 5 and 5 are set such that the phase difference for the light h incident in the direction of an incident angle of 0° is about 10 nm or less. Therefore, brightness of the white display projected by the liquid crystal display apparatus using the liquid crystal panel portion provided with the optical compensation layers 5 and 5 is substantially the same as that obtained by the structure in which no optical compensation layer is provided. Accordingly, bright display can be presented.

Figure 13:
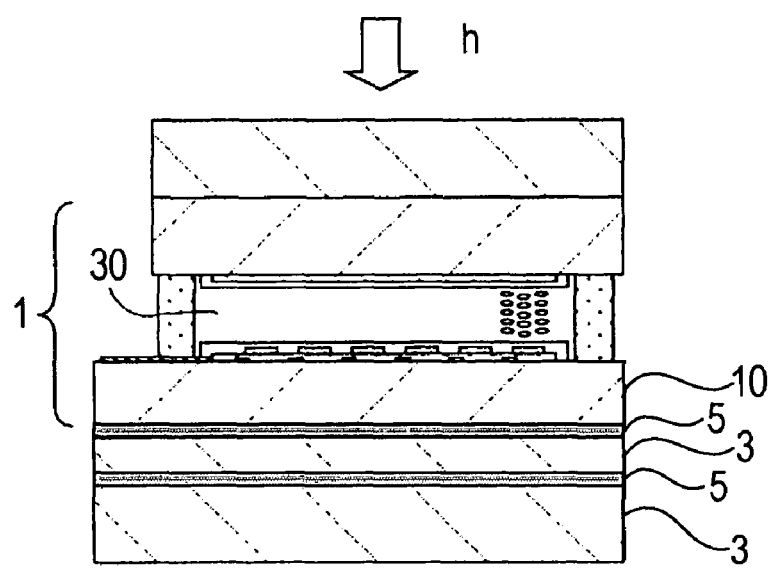
FIG. 13 is a sectional view showing a first modification of the liquid crystal panel portion of the third embodiment.

As a first modification of the above-described third embodiment, FIG. 13 shows an exemplary structure in which two optical compensation layers 5 are provided at the side of the first substrate (TFT substrate) 10. In this case, the first optical compensation layer 5 may be interposed between the first substrate (TFT substrate) 10 and a protection substrate 3, and the second optical compensation layer 5 may be placed between the protection substrate 3 and another protection substrate 3.

Also in this case, each of the optical compensation layers 5 has the characteristics explained in the above-described embodiments, and the optical compensation layers 5 are arranged such that the delay axes thereof are substantially perpendicular to each other with an intersecting angle of, for example, 87° to 93°. In addition, in the state in which the optical compensation layers 5 and 5 are laminated with the protection substrate 3 interposed therebetween, the sum of the phase differences with respect to the light h incident in all directions at an incident angle of 20° or less is set to 30 nm or less. Furthermore, the characteristics of the laminated optical compensation layers 5 and 5 are set such that the phase difference for the light h incident in the direction of an incident angle of 0° is about 10 nm or less. Accordingly, effects similar to the above-described third embodiment can be obtained.

Figure 14:
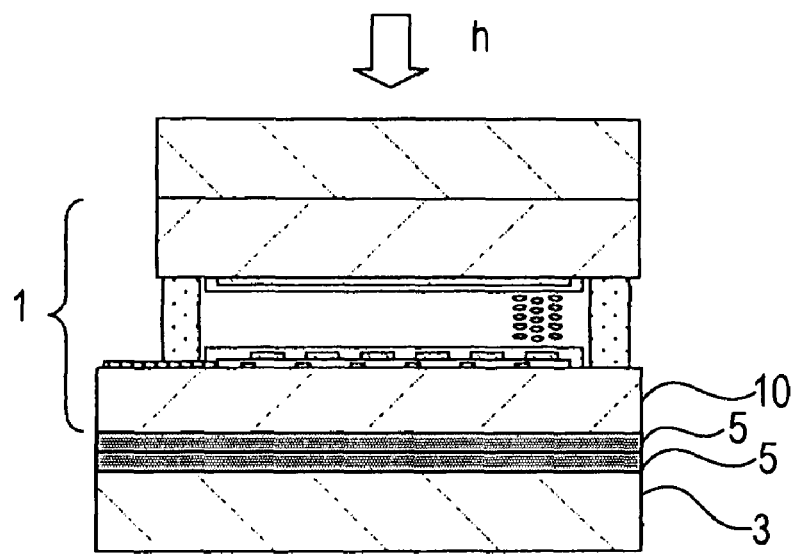
FIG. 14 is a sectional view showing a second modification of the liquid crystal panel portion of the third embodiment.

In addition, FIG. 14 shows a second modification in which two optical compensation layers 5 are provided at the side of the first substrate (TFT substrate) 10. In the second modification, the two optical compensation layers 5 and 5 are interposed between the first substrate (TFT substrate) 10 and the protection substrate 3. Similar to the above-described third embodiment, each of the optical compensation layers 5 has the characteristics explained in the above-described embodiments, and the optical compensation layers 5 are arranged such that the delay axes thereof are perpendicular to each other. In addition, the setting of the phase differences in the state in which the two optical compensation layers 5 and 5 are laminated is similar to that in the above-described third embodiment. Accordingly, effects similar to those of the above-described third embodiment can be obtained. In this case, the two optical compensation layers 5 and 5 are successively formed on the protection substrate 3 in order from the lower layer, and the first substrate 10 and the liquid crystal panel 1 are laminated to each other with the optical compensation layers 5 and 5 therebetween.

Figure 15:
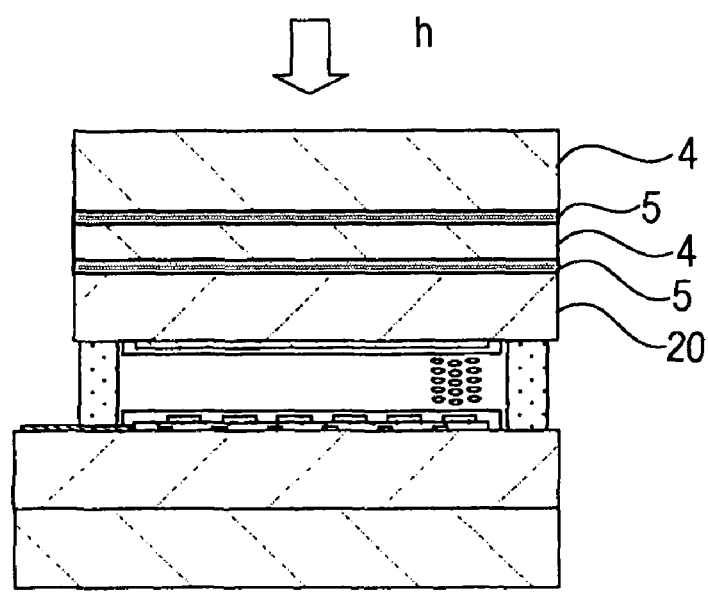
FIG. 15 is a sectional view showing a third modification of the liquid crystal panel portion of the third embodiment.
Figure 16:
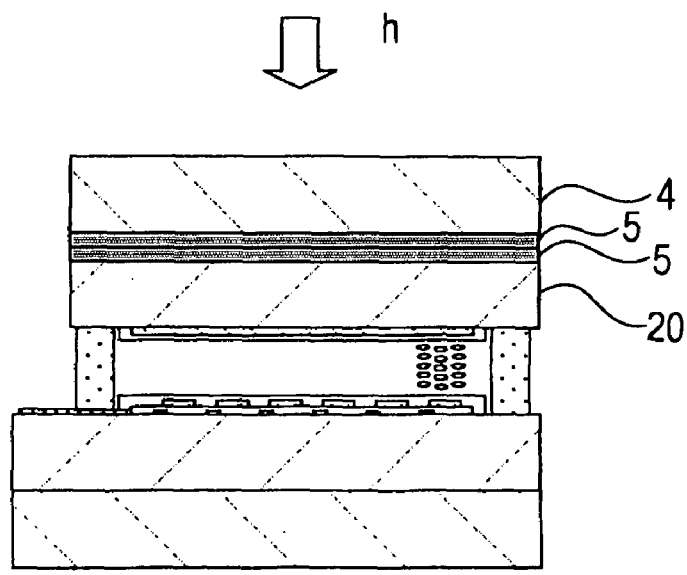
FIG. 16 is a sectional view showing a fourth modification of the liquid crystal panel portion of the third embodiment.

In addition, as third and fourth modifications of the third embodiment, FIGS. 15 and 16 show exemplary structures in which two optical compensation layers 5 are provided at the side of the second substrate (counter substrate) 20. Also in these cases, the structure of the two optical compensation layers 5 and 5 is similar to that of the above-described third embodiment, and effects similar to those of the above-described third embodiment can be obtained.

Figure 17:
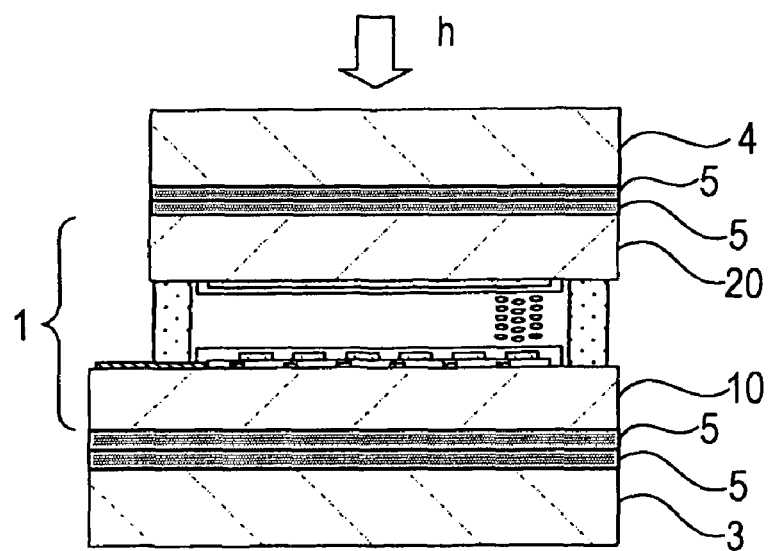
FIG. 17 is a sectional view showing a fifth modification of the liquid crystal panel portion of the third embodiment.

In addition, as a fifth modification of the third embodiment, FIG. 17 shows an exemplary structure in which the liquid crystal panel has three or more (four in the figure) optical compensation layers. In this case, the optical compensation layers 5 are arranged such that the delay axes of two of the optical compensation layers 5 and the delay axes of the other two optical compensation layers 5 are substantially perpendicular to each other with an intersecting angle of, for example, 87° to 93°. In addition, the setting of the phase differences in the state in which the four optical compensation layers are laminated with the liquid crystal panel 1 (and the protection substrates) therebetween is similar to that in the above-described third embodiment. Accordingly, effects similar to those of the above-described third embodiment can be obtained.

Figure 18:
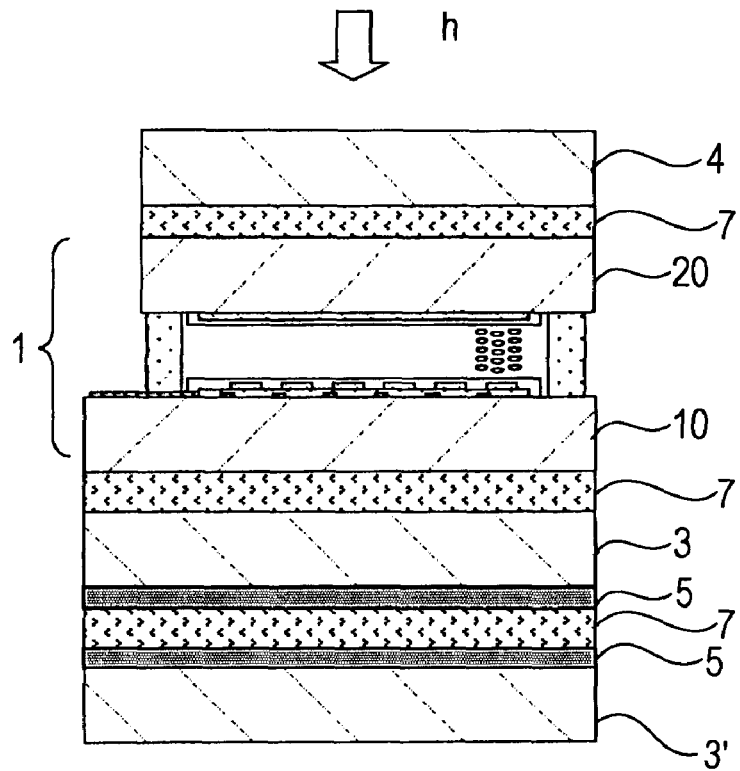
FIG. 18 is a schematic sectional view showing an example in which the liquid crystal panel portion of the third embodiment is manufactured using an adhesive.

In addition, also in the first to fifth modifications of the above-described third embodiment, the protection substrates 3 and 4 or the protection substrates 3 and 4 on which the optical compensation layers 5 are formed may be adhered to the liquid crystal panel 1 using an adhesive. For example, as shown in FIG. 18, the first protection substrate 3 on which the optical compensation layer 5 is formed is adhered to the liquid crystal panel 1 at the side of the first substrate 10 (TFT substrate) such that the adhesive 7 is interposed between the protection substrate 3 and the first substrate 10. Then, the second protection substrate 3' on which the optical compensation layer 5 is formed is adhered at the side of the first substrate 10 such that the adhesive is interposed between the optical compensation layers 5 and 5. In addition, the protection substrate 4 is adhered at the side of the second substrate 20 such that the adhesive 7 is interposed therebetween.

Fourth Embodiment

Figure 19:
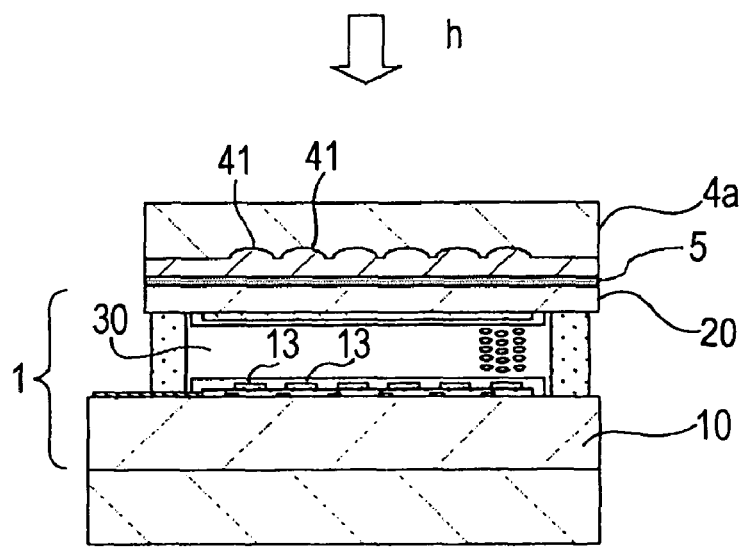
FIG. 19 is a schematic sectional view of a liquid crystal panel portion of a fourth embodiment.

FIG. 19 shows the structure in which a microlens array substrate 4a is adhered to the liquid crystal panel 1 at the side of the second substrate 20. The microlens array substrate 4a may be used as the protection substrate, and the optical compensation layer 5 may be provided between the microlens substrate 4a and the second substrate 20. The microlens array substrate 4a is a substrate obtained by two-dimensionally arranging microlenses in association with the pixel electrodes 13. When the microlens array substrate 4a is provided, the transmissivity can be increased. However, the divergence angle of the light incident on the liquid crystal layer 30 is increased, and therefore the contrast is reduced. However, when the optical compensation layer 5 and the microlens array substrate 4a are used in combination, the view angle is increased and the contrast is improved. Therefore, both high transmissivity and high contrast can be achieved.

In the above-described structure, first, the second substrate 20 and the microlens array substrate 4a are adhered together with the optical compensation layer 5 interposed therebetween. Then, the liquid crystal layer 30 is sealed between the second substrate 20 on which the optical compensation layer 5 and the microlens array substrate 4a are laminated and the first substrate 10. Thus, the liquid crystal panel 1 is manufactured.

Here, although not shown in the figure, in the case in which a double microlens structure is applied in which another microlens substrate is adhered to the first substrate 10, an optical compensation layer may also be provided between the first substrate 10 and the microlens substrate.

In addition, in the case in which the first substrate 10 and the second substrate 20 themselves have microlens arrays, the protection substrates may be provided outside the first substrate 10 and the second substrate 20 having the microlens arrays.

Furthermore, the structure of the fourth embodiment may also be applied in combination with the third embodiment, and a plurality of optical compensation layers 5 may be provided in the structure of the fourth embodiment. In such a case, the structure of the optical compensation layers is similar to that of the third embodiment. By applying such a structure, the effects of the third embodiment can be additionally obtained.

The invention claimed is:

1. A liquid crystal display apparatus characterized by comprising:
   a liquid crystal panel in which a liquid crystal layer is interposed between two substrates;
   a protection substrate disposed at at least one side of the liquid crystal panel so as to face the liquid crystal panel; and
   a plurality of optical compensation layers interposed between the liquid crystal panel and the protection substrate
   wherein pixel electrodes and thin film transistors connected to the pixel electrodes are provided on one of the two substrates, wherein the plurality of optical compensation layers are provided such that delay axes thereof extend in different directions, and are disposed at positions where an optical distance to the layer on which the thin film transistors are formed is in the range of 0.5 mm to 5.0 mm.

2. The liquid crystal display apparatus according to claim 1, characterized in that:
   the film thickness of the optical compensation layer is in the range of 0.25 µm to 0.95 µm.

3. The liquid crystal display apparatus according to claim 1, characterized in that:
   a phase difference of each optical compensation layer is in the range of 20 nm to 80 nm.

4. The liquid crystal display apparatus according to claim 1, characterized in that:
   at lease one of the substrates constituting the liquid crystal panel is provided with microlenses facing the pixel electrodes.

5. A liquid crystal display apparatus characterized by comprising:
   a liquid crystal panel in which a liquid crystal layer is interposed between two substrates;
   a protection substrate disposed at at least one side of the liquid crystal panel so as to face the liquid crystal panel; and
   a plurality of optical compensation layers interposed between the liquid crystal panel and the protection substrate,
   wherein the plurality of optical compensation layers are provided such that delay axes thereof extend in different directions, and are set such that the phase difference for light incident on the optical compensation layers at an incident angle of 20° or less in all directions is 30 nm or less or such that the phase difference for light incident on the optical compensation layers in a direction of the normal is 10 nm or less.

6. The liquid crystal display apparatus according to claim 5, characterized in that:
   the plurality of optical compensation layers are provided such that the delay axes thereof extend substantially perpendicular to each other.

7. The liquid crystal display apparatus according to claim 5, characterized by further comprising:
   polarizing plates disposed at either side of the liquid crystal panel on which the protection substrate is provided;
   an illumination optical system irradiating the liquid crystal panel with illumination light through one of the polarizing plates; and
   a projector lens projecting light that passes through the liquid crystal panel.

8. The liquid crystal display apparatus according to claim 7, characterized in that:
   the optical compensation layers are disposed at defocus positions of the projector lens.

9. The liquid crystal display apparatus according to claim 8, characterized in that:
   pixel electrodes and thin film transistors connected to the pixel electrodes are provided on one of the two substrates; and
   the optical compensation layers are disposed at positions where an optical distance to the layer on which the thin film transistors are formed is in the range of 0.5 mm to 5.0 mm.

10. The liquid crystal display apparatus according to claim 5, characterized in that:
    the film thickness of each optical compensation layer is in the range of 0.25 µm to 0.95 µm.

11. The liquid crystal display apparatus according to claim 5, characterized in that:
    a phase difference of each optical compensation layer is in the range of 20 nm to 80 nm.

12. The liquid crystal display apparatus according to claim 5, characterized in that:
    at lease one of the substrates constituting the liquid crystal panel is provided with microlenses facing the pixel electrodes.

13. The liquid crystal display apparatus according to claim 5, characterized by further comprising:
    a microlens array substrate provided outside at least one of the substrates constituting the liquid crystal panel, the microlens array having microlenses facing the pixel electrodes,
    wherein the microlens array substrate functions as the protection substrate, and the optical compensation layers are disposed between the liquid crystal panel and the microlens array substrate.

* * * * *